United States Patent
Lam et al.

(10) Patent No.: US 9,497,042 B2
(45) Date of Patent: Nov. 15, 2016

(54) NOTIFICATION ENGINE

(75) Inventors: Long Lam, London (GB); Richard Tucker, Essex (GB); Gang Wang, Beijing (CN)

(73) Assignee: FRANCE TELECOM, Paris (FR)

(*) Notice: Subject to any disclaimer, the term of this patent is extended or adjusted under 35 U.S.C. 154(b) by 185 days.

(21) Appl. No.: 13/536,230

(22) Filed: Jun. 28, 2012

(65) Prior Publication Data
US 2013/0031189 A1    Jan. 31, 2013

(30) Foreign Application Priority Data

Jun. 29, 2011  (EP) .................................... 11305833

(51) Int. Cl.
*G06F 15/16*   (2006.01)
*H04L 12/58*   (2006.01)
*G06Q 10/10*   (2012.01)
*G06Q 50/00*   (2012.01)

(52) U.S. Cl.
CPC ........... *H04L 12/587* (2013.01); *G06Q 10/107* (2013.01); *G06Q 50/01* (2013.01)

(58) Field of Classification Search
USPC ................................................. 709/200, 206
See application file for complete search history.

(56) References Cited

U.S. PATENT DOCUMENTS

| | | | |
|---|---|---|---|
| 6,622,160 B1 | 9/2003 | Horvitz | |
| 6,662,213 B1* | 12/2003 | Xie | H04L 1/1642 709/206 |
| 6,775,707 B1* | 8/2004 | Bennett | H04B 7/18593 370/395.4 |
| 7,222,158 B2* | 5/2007 | Wexelblat | G06Q 30/06 709/206 |
| 7,529,795 B2* | 5/2009 | Arav | G06Q 10/107 709/204 |
| 8,244,796 B1* | 8/2012 | James | G06Q 10/10 709/203 |
| 8,400,944 B2* | 3/2013 | Robinson | G06Q 10/10 370/254 |
| 8,856,807 B1* | 10/2014 | Khapre | G06F 3/00 714/48 |
| 9,202,384 B2* | 12/2015 | Petker | G09B 5/08 |
| 2002/0161841 A1* | 10/2002 | Kinnunen | H04M 3/4872 709/206 |
| 2003/0093483 A1* | 5/2003 | Allen | G06Q 10/107 709/207 |
| 2004/0061716 A1 | 4/2004 | Cheung et al. | |
| 2004/0128359 A1* | 7/2004 | Horvitz | G05B 19/404 709/207 |
| 2004/0181580 A1* | 9/2004 | Baranshamaje | H04L 12/58 709/206 |
| 2004/0230661 A1* | 11/2004 | Rashid | H04L 12/587 709/207 |

(Continued)

OTHER PUBLICATIONS

European Search Report and Written Opinion dated Oct. 31, 2011 for corresponding European Application No. a11305833.3, filed Jun. 29, 2011.

*Primary Examiner* — Anthony Mejia
(74) *Attorney, Agent, or Firm* — David D. Brush; Westman Champlin & Koehler, P.A.

(57) ABSTRACT

A method and apparatus are provided. The method is carried out by a notification engine, for delivering to a user equipment a group of incoming notifications from at least one application running on the user equipment. The application running on the user equipment is registered on the notification engine. The method includes: defining at least one criterion for delivering notifications, buffering the incoming notifications, and delivering according to the criterion a group of previously buffered notifications.

14 Claims, 3 Drawing Sheets

(56) References Cited

U.S. PATENT DOCUMENTS

| | | | | |
|---|---|---|---|---|
| 2004/0254998 A1* | 12/2004 | Horvitz | G06Q 10/107 | 709/206 |
| 2006/0168065 A1* | 7/2006 | Martin | G06Q 10/107 | 709/206 |
| 2007/0073708 A1* | 3/2007 | Smith et al. | | 707/10 |
| 2007/0078935 A1* | 4/2007 | Garcia-Martin | H04L 51/04 | 709/206 |
| 2007/0203995 A1* | 8/2007 | Wang | H04L 29/06027 | 709/206 |
| 2007/0250583 A1* | 10/2007 | Hardy | G06Q 10/107 | 709/206 |
| 2008/0182601 A1* | 7/2008 | Cho | H04L 51/38 | 455/466 |
| 2009/0187631 A1* | 7/2009 | Su | H04L 12/6418 | 709/206 |
| 2009/0300121 A1* | 12/2009 | Bartlett | G06Q 10/107 | 709/206 |
| 2010/0011072 A1* | 1/2010 | Mishchenko | G06Q 10/10 | 709/206 |
| 2010/0154059 A1* | 6/2010 | McNamee | H04L 12/2602 | 726/23 |
| 2010/0179994 A1* | 7/2010 | Bittles | G06Q 10/107 | 709/206 |
| 2010/0250682 A1* | 9/2010 | Goldberg | G06Q 10/107 | 709/206 |
| 2011/0029622 A1* | 2/2011 | Walker | G06Q 10/107 | 709/206 |
| 2011/0130958 A1* | 6/2011 | Stahl | G01C 21/362 | 701/533 |
| 2011/0167120 A1* | 7/2011 | Boyer | H04N 5/44543 | 709/206 |
| 2011/0314106 A1* | 12/2011 | Bansal | H04L 12/585 | 709/206 |
| 2012/0030292 A1* | 2/2012 | John | G06F 17/30023 | 709/206 |
| 2012/0158921 A1* | 6/2012 | Asveren | H04L 69/40 | 709/220 |
| 2012/0166530 A1* | 6/2012 | Tseng | G06Q 30/0255 | 709/204 |
| 2012/0166931 A1* | 6/2012 | Alonso | G06Q 30/0201 | 715/234 |
| 2012/0203831 A1* | 8/2012 | Schoen | G06Q 10/10 | 709/204 |
| 2012/0246246 A1* | 9/2012 | Moore | H04N 21/4333 | 709/206 |
| 2012/0303734 A1* | 11/2012 | Whitmyer, Jr. | G06F 21/6218 | 709/206 |
| 2012/0311045 A1* | 12/2012 | Sylvain | H04L 51/12 | 709/206 |
| 2013/0073995 A1* | 3/2013 | Piantino | G06Q 50/01 | 715/764 |
| 2013/0159082 A1* | 6/2013 | Abbott | G06Q 10/107 | 705/14.25 |
| 2013/0318177 A1* | 11/2013 | Tan | H04L 43/08 | 709/206 |
| 2016/0004410 A1* | 1/2016 | Srinivasan | G06Q 50/01 | 715/765 |

* cited by examiner

NOTIFICATION ENGINE

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure generally relates to communication management and in particular to management of notification transmission to a user.

It finds applications, in particular while not exclusively, in user communication equipments adapted to run applications for which notifications can be received, such as a mobile device, a Smartphone, a Personal Digital Assistant (PDA).

BACKGROUND OF THE DISCLOSURE

Over the last few years, the development of social networks and messaging services has lead to an important increase of information that needs to be continuously updated and transmitted to the users of such services.

Such social networks can be accessed in a plurality of ways by the user, for example on a mobile device such as a Smartphone, a personal computer or a laptop.

To this end, such communication devices are adapted to run a plurality of applications that give an access to different social networks or messaging services, such as Gmail™, Facebook™, Twitter™, Hotmail™, etc.

When an update is made on one of these services, when a new message or an invitation to an event is received, for example, a new notification intended to the user of the mobile device is sent, thus leading to a great amount of notifications per day. Furthermore, such notifications can relate to a received Short Message Service (SMS), an e-mail, a missed call, an update, a feed, a tweet or other information.

By overwhelming the user with a profusion of notifications, there is a risk of losing a relevance level of information or of immersing the user in the amount of information.

In addition, due to the nature of the way these notifications are delivered, e.g. with SMS, which uses a send and store method, notifications do not always arrive in the order they are sent.

SUMMARY

To address these needs, a first aspect of the invention relates to a method carried out by a notification engine, for delivering to a user equipment a group of incoming notifications from at least one application running on the user equipment, the application running on the user equipment being registered on the notification engine. The method comprises:
  a step of defining at least one criterion for delivering notifications,
  a step of buffering the incoming notifications, and
  a step of delivering according to the criterion a group of previously buffered notifications.

An embodiment of the present invention enables a method to buffer notifications intended to a user equipment and thus avoids receiving continuously an overwhelming number of notifications at the user equipment side. The notifications are then delivered in the form of a group of previously buffered notifications thus decreasing the number of alerts that are received by the user equipment. In addition, delivering the notifications is performed based on at least one criterion, which can be defined by a user of the equipment for example. Such configurability enables to control the reception of notifications.

According to some embodiments of the invention, the criterion is a time period to deliver the group of previously buffered notifications to the user equipment, the step of delivering the group of previously buffered notifications being performed upon expiration of the time period.

Such embodiments enable to define a time period to deliver a group of buffered notifications. Thus, it is possible to control the frequency of delivering the notifications. For example, a user of the equipment can define the time period and knows in advance that he will receive a group of notifications at the expiration of the time period. In other examples, the time period can be defined by a telephony operator or can be predefined in the user equipment.

Alternatively, the criterion is a criterion to filter the group of previously buffered notifications.

An embodiment of the present invention enables to determine criteria to filter the notifications, and thus to determine which notifications have to be delivered and in which order.

In complement, the criterion can be a maximum number of notifications to be delivered at the same time and the number of previously buffered notifications in the group is less or equal to the maximum number.

Such embodiments enable to limit the number of notifications comprised in the delivered group, and thus enable decreasing the amount of received notifications by defining a maximum number. Thus, to avoid being overwhelmed with notifications, the user of the equipment can choose to receive the notifications in the form of groups comprising at most a previously defined number of notifications.

In some embodiments, when the number of buffered incoming notifications reaches the maximum number, all previously buffered notifications are delivered in the group to the user equipment.

These embodiments enable to define a fixed number of notifications to be received in a group.

Alternatively, another criterion is a time period to deliver the group of previously buffered notifications to the user equipment, the method further comprising:
  upon reception of at least one notification from the registered application and intended to the user equipment, buffering the notification;
  if the predefined time period has elapsed, then considering a group of notifications to deliver to the user equipment by the end of the time period, the group comprising the buffered notifications if the number of buffered notifications is less than or equal to the maximum number, or else a number of buffered notifications equal to the maximum number and considering complementary notifications by the end of a next time period;
  else, repeating the previous steps upon reception of a new notification.

Such embodiments enable to define several criteria to control simultaneously the maximum number of buffered notifications that a group can comprise and the time period at which the user wants to receive such group. In addition, no information is lost insofar as buffered notifications that are not delivered at an end of a given time period can be delivered at the expiration of a next time period.

In complement, still another criterion can be a periodicity and the next time period is calculated by the notification engine based on the periodicity and the time period.

Such embodiments enable to deliver the group of buffered notifications periodically. Thus, the user can control with accuracy the frequency of delivery of the notifications and the maximum number of buffered notifications that are comprised in the delivered group.

According to some embodiments of the invention, the group of previously buffered notifications is delivered in the form of a list, the criterion is at least one identifier of a preferred application running on the user equipment, and notifications from the preferred application are delivered on the top of the list.

Therefore, the configurability of the notification engine is enhanced in that preferred applications can be predefined. For example, it can be considered that missed voice calls and SMS are more important than some automatic notifications issued from a given social network application. Then, upon reception of the group of notifications, missed voice calls and SMS will be presented on the top of the list, thus enabling the user to access directly to relevant information.

In some other embodiments, the group of previously buffered notifications is delivered in the form of a list, at least one notification comprises an identifier of a sender, the criterion is at least one preferred contact and if for a given notification, the identifier of the sender is the preferred contact, then the given notification is delivered on the top of the list.

It enables advantageously to enhance the configurability of the notification engine. For example, a user can select "VIP" contacts among his contacts on Facebook™ or among the contacts that are recorded on a Subscriber Identity Module (SIM) of his Smartphone. Other "VIP" contacts can be defined from the contacts of user A on other applications. The notifications that are related to such "VIP" contacts will be presented at the top of the list, thus enabling to favour relevant information to be displayed to the user of the equipment.

Such embodiments are compatible with the previously presented embodiments in which a preferred application is defined. A user can then personalize filters to be applied after the notifications are buffered.

According to some embodiments of the invention, after delivering the group of previously buffered notifications to the user equipment, the buffered notifications that have been delivered are deleted from the notification engine and the previous steps are repeated.

Such embodiments enable to iterate the method by continuously buffering notifications and deliver them in the form of groups. Thus, a notification that has been received but not transmitted in a group is kept in buffer and transmitted in a new group. Taken in combination with the previous embodiments, this enables to filter the notifications, without loss of information, as even non relevant information will be delivered to the user equipment.

In some embodiments of the invention, at least one notification comprises an identifier of a sender, the criterion is at least one preferred contact or one preferred application, and if for a given notification, the identifier of the sender is the preferred contact, or if the given notification is from a preferred application, then the step of buffering the given notification is skipped and the given notification is delivered.

Such embodiments enable to prioritize some notifications depending on predefined criteria, i.e. the definition of preferred contacts and preferred applications, by delivering them in real time instead of buffering them. Then, the most relevant information is transmitted to the user in real time, whereas less relevant notifications are buffered to avoid overwhelming the user with notifications.

According to further embodiments, each incoming notification is adapted to generate a pop-up window on a display unit of the user equipment.

A second aspect of the invention concerns a computer program product recorded on a storage medium and executable by a computer in the form of a software agent including at least one software module setup to implement the method according the first aspect of the invention.

A third aspect of the invention relates to a notification engine for delivering to a user equipment a group of incoming notifications from at least one application running on the user equipment, comprising:
    means for registering the application running on the user equipment,
    means for defining at least one criterion for delivering notifications,
    means for buffering the incoming notifications, and
    means for delivering according to the criterion a group of previously buffered notifications.

According to some embodiments, the notification engine is comprised in the user equipment.

A fourth aspect of the invention concerns a user equipment for receiving a group of incoming notifications from at least one application running on the user equipment, the user equipment comprising a notification engine comprising:
    means for registering the application running on the user equipment;
    means for defining at least one criterion for delivering notifications;
    means for buffering the incoming notifications;
    means for delivering according to the criterion a group of previously buffered notifications.

BRIEF DESCRIPTION OF THE DRAWINGS

An embodiment of present invention is illustrated by way of example, and not by way of limitation, in the figures of the accompanying drawings, in which like reference numerals refer to similar elements and in which.

DETAILED DESCRIPTION OF ILLUSTRATIVE EMBODIMENTS

Figure 1:
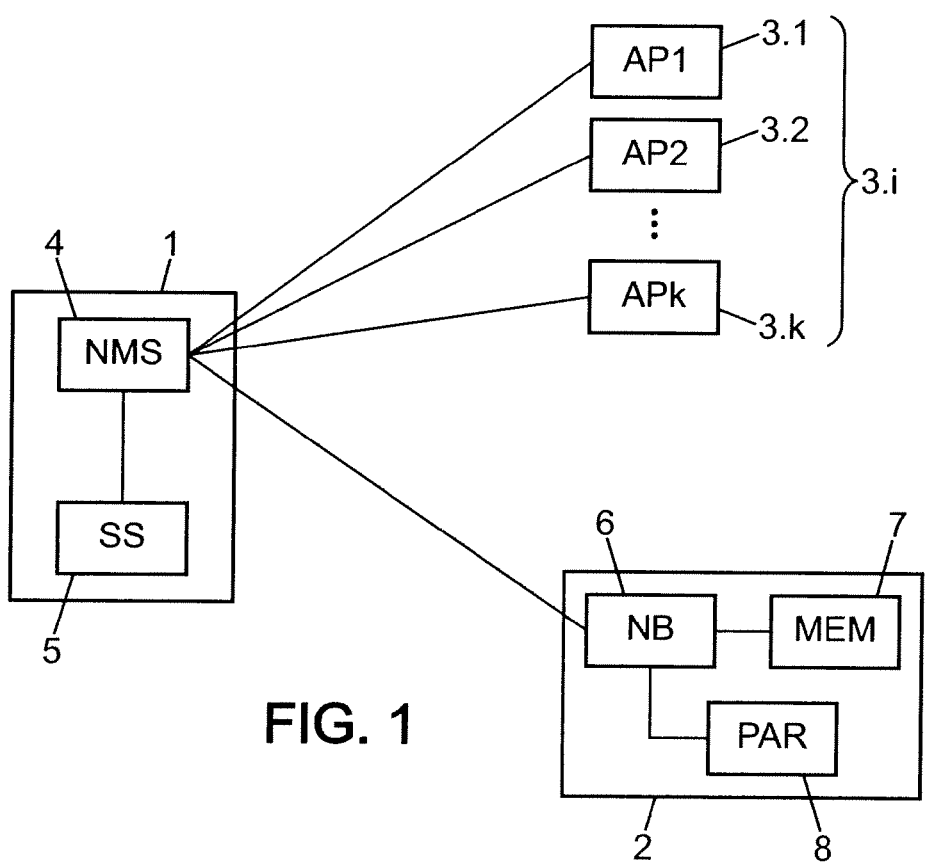
FIG. 1 represents a communication system comprising a user equipment of a user, a plurality of application servers and a notification engine according to some embodiments of the invention.

Referring to FIG. 1, there is shown a communication system comprising a user equipment 1 of a user A, a plurality of application servers 3.*i*, comprising application servers 3.1 to 3.*k* and a notification engine 2 according to some embodiments of the invention.

In what follows, the user equipment 1 is considered to be a mobile phone, and in particular a Smartphone. However, no restriction is attached to the type of user equipment that is considered. For example, it can be a personal computer, a laptop, a PDA etc.

Application servers 3.1-3.*k* can refer to social network platforms, SMS centres, MMS centres, call centres, messaging servers etc. In what follows, we consider application server 3.1 as being a Facebook™ platform, application server 3.2 as being a SMS centre, and application server 3.*k* as being a MSN Hotmail™ messaging server. No restriction is attached to the applications considered and the restriction to three applications is only described for the sake of better understanding. For example, any social network such as LinkedIn™, Twitter™, or any messaging service can be considered according to an embodiment of the invention.

On the Smartphone 1, several applications are running. In what follows, we consider that a Facebook™ application and a MSN Hotmail™ application are running on the Smartphone 1. The Smartphone 1 is also adapted to receive SMS. As these applications are running on the Smartphone 1, it can receive notifications from the dedicated application servers 3.1-3.*k* when a status update has been made on a Facebook™ account of user A, when a contact has sent a message on Facebook™ or MSN Hotmail™ to the user A of the Smartphone 1, or when a SMS is received from a given contact and is intended to user A. These notifications are received by a notification manager service 4 of the Smartphone 1, which provides an interface between the application servers 3.1-3.*k*.

Upon reception of notifications, they can be transmitted to a status bar service 5 of the Smartphone 1, which is adapted to display the notifications on a display of the Smartphone (not represented on FIG. 1).

According to an embodiment of the invention, the communication system also comprises a notification engine 2, which is adapted to communicate with the Smartphone 1 of the user A. In some embodiments, the notification engine 2 is not dedicated to a single user equipment and can be a centralized unity, which can implement an embodiment of the invention for a plurality of user equipments. In some other embodiments, the notification engine is included in the Smartphone 1.

The notification engine 2 comprises a notification buffer 6, a memory 7 and a parameter unit 8.

The notification buffer 6 is adapted to communicate with the notification manager service 4 of the Smartphone 1 and to exchange notifications and settings. Settings enable to define criteria for delivering the notifications and enable to register applications that are running on the Smartphone 1. Settings are stored in the parameter unit 8.

Notifications can be buffered by the notification buffer 6 in the memory 7 and can then be delivered to the notification manager service 4 depending on the settings that are stored in the parameter unit 8.

According to some embodiments of the invention, upon reception of a notification from a given application server 3.*i* by the notification manager service 4, the notification is directly transmitted to the notification engine 2, and in particular to the notification buffer 6. If the application corresponding to the application server 3.*i*, which has emitted the notification, is not registered on the notification engine 2 (i.e. is not registered in the parameter unit 8), then the notification is returned to the notification manager service for a direct transmission to the status bar service 5.

If the application is registered in the parameter unit 8, then the notification is buffered in the memory 7, and the criteria stored in the parameter unit 8 are consulted by the notification buffer 6 to know if a group of notifications should be delivered to the notification manager service 4.

According to some embodiments of the invention, several criteria for delivering notifications can be defined and used to decide when and how notifications should be delivered. For example, a criterion can relate to a frequency at which groups of notifications are delivered. A criterion can also relate to a number or a maximum number of notifications that should be delivered in a given group. Other criteria can also define preferred applications or preferred contacts. All or some of the criteria can be defined by the user A, through given menus on the Smartphone 1, which enable to define the criteria that have to be sent to the notification engine 2 to be stored in the parameter unit 8. The user A can also have an online access through an other equipment such as a computer for example, to define the criteria that should be stored in the parameter unit 8 of the notification engine 2.

Thus, in some embodiments of the invention, a maximum number N of notifications to be stored can been defined by the user A as a criterion for delivering notifications. Upon reception of one or several new notification from the notification manager service 4, the notification buffer 6 stores the new notifications in the memory 7 and checks if the number of stored notifications in the memory 7 is equal to or exceeds to the maximum number N. If this is the case, a group of N notifications is delivered by the notification buffer 6 to the notification manager service 4. In some embodiments, when the notification manager service 4 receives a group of notifications from the notification buffer 4, it forwards the group of notifications to the status bar service 5, so that the status bar service 5 can display alerts on the display of the Smartphone 1, in order to inform the user A that a group of notifications have been received.

The user A can also define a time interval T (equivalent to define a frequency) at which he wants to receive the notification. This criterion can be compatible with the maximum number N. For example, the user A can define that he wants to receive a maximum number of 10 notifications each 30 minutes. Alternatively, user A can decide to receive each 30 minutes a group of notifications comprising all the notifications that have been received within the period of 30 minutes. When the time interval T is set and stored in the parameter unit 8, the notification buffer checks permanently or periodically if the time interval T has expired.

If this is the case and that a maximum number N has been defined, the notification buffer 6 delivers a group of notifications comprising N notifications, if the memory 7 comprises N or more than N notifications, or all the notifications, if the memory 7 comprises less than N notifications. If some notifications are not transmitted because more than N notifications were buffered in the memory 7, these notifications can be transmitted in priority at the expiration of a next time interval, according to some embodiments of the invention, which allows avoiding a loss of information. In addition, the notification buffer 6 can notify the notification manager service 4 that some buffered notifications have not been transmitted, and will be transmitted at a next time interval. Then the status bar service 5 can display a visual representation to inform the user A that an excess of notifications has not been displayed, yet.

If this is the case and that no maximum number N has been defined, the notification buffer 6 delivers all the notifications that have been buffered in the memory 7 during the last time interval T.

It is to be noted that according to some embodiments, the notifications that are delivered to the notification manager service 4 are deleted from the memory 7. In other embodiments, the notifications that are delivered are not deleted until a reception acknowledgment has been received from the Smartphone 1. According to still other embodiments, the notifications are buffered until a maximum memory space of the memory 7 is full. In this case, the buffered notifications that have not been transmitted at a previous time interval are transmitted in priority, according to some embodiments of the invention.

Preferred applications can also be defined by the user A and can be stored in the parameter unit 8. For example, the user A can consider that notifications related to missed voice calls and SMS are more important than Facebook™ notifications. To this end, the user A defines SMS and missed voice calls as preferred applications, and these criteria are stored in the parameter unit 8.

Thus, when the notification buffer 8 receives a notification, it checks in the parameter unit 6 whether the notification comes from a preferred application (if the notification is a SMS or a missed voice call in the considered example). If this is the case, the notification is immediately returned to the notification manager service 4, according to some embodiments of the invention.

According to some other embodiments, the notifications that are buffered in the memory 8 are buffered in the form of an ordered list. In this case, a notification originating from a preferred application (if the notification is a SMS or a missed voice call in the considered example) is placed on the top of the list, regardless of when the notification has been received, according to some embodiments of the invention. A list of notifications, comprising notifications from preferred applications on the top, can then be delivered according to some of the criteria that have been presented before.

Furthermore, preferred contacts can be defined by the user A and can be stored in the parameter unit 8. For example, user A can consider that notifications that are originating from colleagues are more important that notifications originating from his friends. The preferred contacts can be defined by storing an e-mail address, a phone number or an identifier on a given social network, of preferred contacts.

Thus, upon reception of a notification, the notification buffer 6 can check whether the notification is related to a preferred contact. To this end, when an e-mail is received from a given e-mail address, this given e-mail address is compared by the notification buffer 6 with preferred e-mail addresses that are stored in the parameter unit 8. When a SMS or a missed voice call notification is received from a given phone number, the given phone number is compared by the notification buffer 6 with the preferred phone numbers that are stored in the parameter unit 8.

In some embodiments, if a notification is received from the notification manager service 4 and originates from a preferred contact (a colleague in the considered example), the notification buffer 6 can directly return the notification to the notification manager service 4. The notification manager service 4 can then forward the notification to the status bar service 5, so that an alert is displayed in priority (in real time) for this notification.

In some other embodiments, if a given notification is received from the notification manager service 4 and originates from a preferred contact (a colleague in the considered example) and if the notifications that are buffered in the memory 8 are buffered in the form of an ordered list, the notification buffer 6 can place the given notification on the top of the list, regardless of when the given notification has been received. The list can then be transmitted to the notification manager service 4 depending on the other criteria, as it has been explained before. The notification manager service 4 then forwards the list to the status bar service 5.

Furthermore, the status bar service 5 can display specific icons that are dedicated to notifications from preferred contacts or preferred applications, and/or can display these notifications into a separated area of a notification area, which enables to highlight the notifications which comprise relevant information to the user. In some embodiments, different specific icons are used to differentiate notifications coming from preferred applications from notifications coming from preferred contacts. All other notifications can be time stamped as normal and displayed chronologically for example.

According to some other embodiments, another criterion can be favourite keywords that are defined by the user A and that can be compared by the notification buffer 6 with text comprised in the received notifications. The notifications comprising such favourite keywords can then be transmitted to the notification manager service 4 in priority (in the top of the list or in real time, as previously explained). For example, if an e-mail intended to the user A comprises the word "urgent" in its title field and if the user A has defined the word "urgent" as a favourite keyword, the e-mail can be transmitted to the notification manager service 4 in priority. No restriction is attached to the type of criterion that is defined to enable a filtering of the notifications according to an embodiment of the present invention.

Such criteria enable to permit the configurability of the reception of notifications at the user A side. Indeed, by defining a maximum number N, a time interval T and preferred applications and contacts, an embodiment of the present invention enables a filtering of the notifications so that the user A can access to relevant notifications in priority and avoid being overwhelmed under the number of notifications. An embodiment of the present invention thus enables to let the user decide when and how many notifications he wants to receive. Indeed, the notification buffer 6 can slow down or speed up the display rate of the notifications, depending on the settings that have been defined by the user A and that can reflect the user's mood or the available time of the user for example. It is to be noted that the user A can define a set of criteria for a given period of the day or for a given day of the week. For example, he can decrease the time interval T from 30 minutes to 10 minutes during the week end, because he is not in office and he can consult more often the notifications.

Furthermore, in some embodiments, the present invention does not take into account the order in which notifications are received and therefore the order in which notifications are displayed. On the contrary, the systems according to the prior art display the latest notifications first, rather than the most important or relevant ones first.

Figure 2:
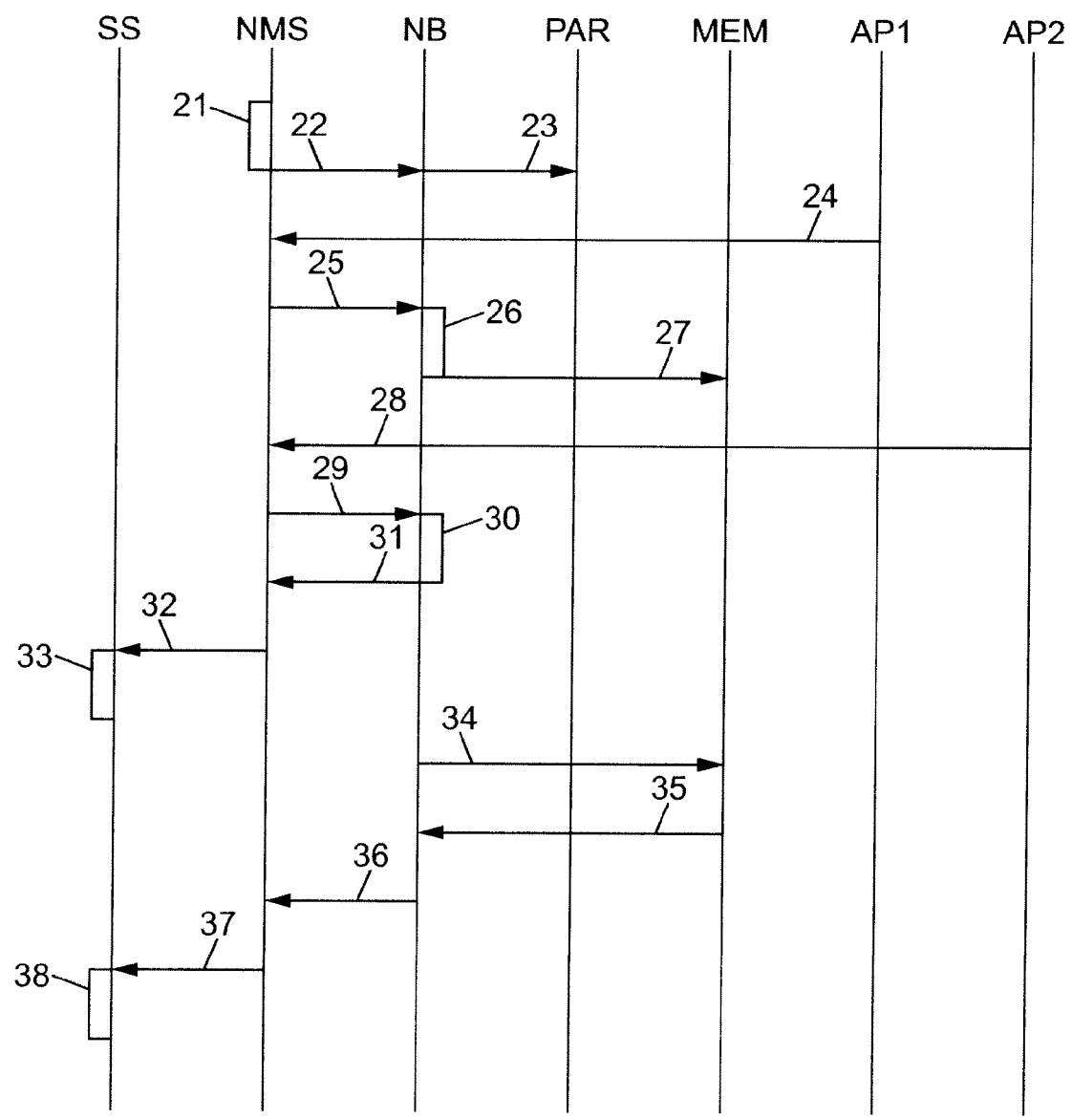
FIG. 2 represents a temporal flowchart illustrating the implementation of an embodiment of the invention in the communication system presented on FIG. 1.

Referring now to FIG. 2, there is shown a flowchart illustrating the implementation of an embodiment of the invention in the communication system presented on FIG. 1.

At a step 21, the user A defines on his Smartphone 1 (or alternatively via an online access through an other equipment) several criteria concerning how and when to receive notifications and determines the applications running on the Smartphone 1 that can be registered on the notification engine 2. In this example, the user A decides to receive a maximum number of 5 notifications at time intervals of 10 minutes. The user A also defines a preferred contact, corresponding to the phone number of a user B. The user A also defines that he wants to receive in real time the notifications that are related to his preferred contacts. Then, the user A defines the applications to be register as being the Facebook™ application and the SMS application.

All these settings (criteria, preferred contact and applications to register) are transmitted at a step 22 to the notification buffer 6, which forwards it to the parameter unit 8 at a step 23.

Then, a user C sends a message on Facebook™ to the Facebook™ account of the user A. Thus, a notification is sent from the application server 3.1 to the notification manager service 4, to indicate that a message has been received.

At step 25, the notification manager service 4 transmits the notification to the notification buffer 6. At step 26, the notification buffer 6 checks in the parameter unit 8 whether Facebook™ is a preferred application or whether an identifier of user C is a preferred contact. As this is not the case, the Facebook™ notification is transmitted to the memory 7, which buffers the notification. The notification buffer 6 then checks if the memory 7 buffers five or more than five notifications, and checks whether a time interval of ten minutes has expired since the reception of the settings. Assuming that no notification has been buffered before and that the time interval of ten minutes has not expired, the Facebook notification is buffered in the memory 7 at step 27.

At step 28, user B sends a SMS to the Smartphone 1 of user A. A SMS notification is redirected by the notification manager service 4 to the notification buffer 6 at step 29. At step 30, the notification buffer 6 checks in the parameter unit 8 whether SMS is a preferred application or whether an identifier of user B is a preferred contact. As the phone number of user B is a preferred contact, as the SMS notification originates from the phone number of user B and as user A has chosen to directly receive the notifications from preferred applications or contacts, the SMS notification is directly returned at step 31 by the notification buffer 6 to the notification manager service 4. At step 32, the notification manager service 4 forwards the SMS notification to the status bar service 5. The status bar service then displays the SMS notification in the notification area at step 33. In some embodiments, the SMS notification is displayed with a specific icon, to inform the user A that a notification has been received from a preferred contact.

Then, the notification buffer 6 determines (by means of an internal clock for example, which has not been represented on FIG. 1), that the time interval of 10 minutes has expired since the settings have been received. The notification buffer 6 then verifies at step 34 that the number of notifications that are buffered in the memory 7 does not exceed ten notifications. As only one notification (the Facebook™ notification from user C) is buffered in the memory 7, all the notifications should be transmitted to the Smartphone 1. Thus, the memory 7 forwards the Facebook™ notification to the notification buffer 6, at step 35. The notification buffer 6 then transmits the Facebook™ notification to the notification manager service 4 at step 36, which forwards the Facebook™ notification to the status bar service 5 at step 37. The status bar service then displays the Facebook notification in the notification area at step 38.

FIG. 2 only illustrates a specific example of application of the present invention. The previous steps depend on the original settings that are defined by user A and depend on events that cause notifications.

Figure 3:
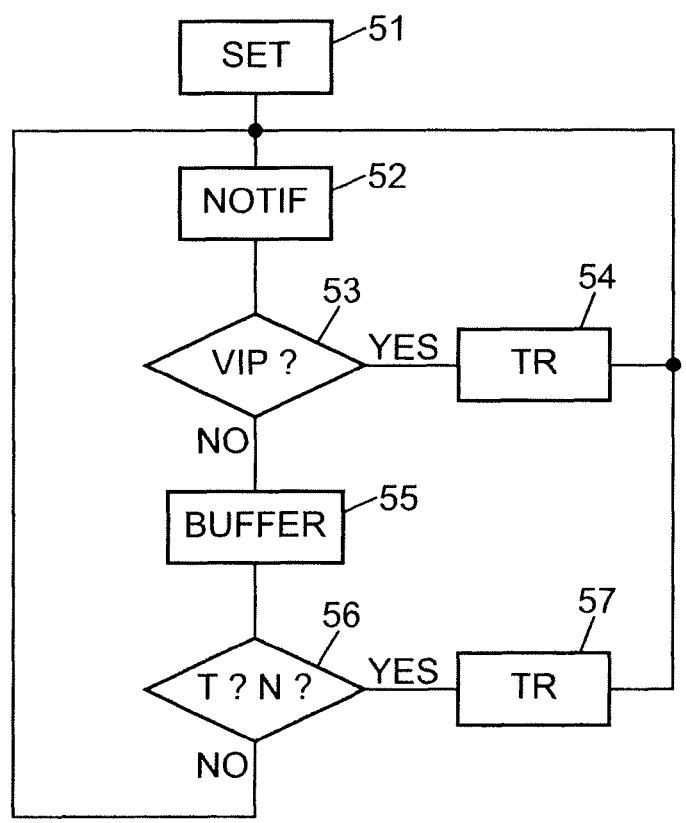
FIG. 3 represents a flowchart representing the general steps of a method according to some embodiments of the invention.

Referring now to FIG. 3, there is shown a flowchart representing the general steps of a method according to some embodiments of the invention. All the steps that are described with reference to FIG. 3 can be processed at the level of the notification engine 2.

At step 51, settings are received from the Smartphone 1. The settings can define a time interval T to deliver notifications, a maximum number N of notifications to be delivered at the same time, preferred contacts and preferred applications, applications to be registered and a mode to transmit the notifications originating from preferred applications or contact (in real time or on the top of a list).

At step 52, the notification buffer 6 receives a notification (or several notifications) from an application, which has been redirected by the notification manager service 4 of the Smartphone 1.

At step 53, the notification buffer 6 determines if the received notification comes from a preferred application or a preferred contact. If this is the case and if the user A has defined in the settings that he wants to receive the notifications originating from preferred applications or contacts in real time, then the notification is returned to the notification manager service 4 of the Smartphone 1 at step 54. Then, the notification buffer 6 waits for a new notification to buffer or to transmit, and the method can be repeated from step 52.

Else, the notification is buffered in the memory 7 at step 55. The notification buffer 6 then checks at step 56 whether the number of buffered notifications exceeds N or whether the time interval T has expired. If this is the case, the notification buffer 6 delivers at step 57 a group of notifications comprising N notifications if the memory 7 comprises N or more than N notifications or all the notifications if the memory 7 comprises less than N notifications.

Else, the notification buffer waits for a new notification to be buffered or transmit, and the method can be repeated from step 52.

It is noted that new settings can be sent at any time by the user A from the Smartphone 1 to the notification engine 2, and the settings can thus be updated in the parameter unit 8.

It is also noted that the criterion relating to the expiration of the time interval is preferably checked permanently and is not only performed after reception of a new notification. This enables to deliver the notifications at more precise time intervals. More precisely, an internal time can be set to a constant time interval T, and when this is reached, all or some of the notifications can be delivered, as it has been previously explained. This embodiment avoids checking the expiration of the time interval T each time a notification is buffered.

According to some embodiments, using the notification engine 2 is an option, which is activatable by the user A at the level of the Smartphone 1. When the notification engine 2 is disabled, the notifications are not displayed chronologically (not displayed in the order they are sent), without being buffered, according to implementations of the prior art.

Furthermore, to implement some embodiments of the present invention, in which the functionalities of the notification engine 2 are comprised in the Smartphone 1, the operating system of the Smartphone 1 can be modified. For example, taking the example of the Google™ Android™ operating system, the following modifications can be applied in order to enable some embodiments of the present invention:

the class NotificationManager is modified so that it can filter and group VIP notifications from all other notifications and display them in the notification area. As the class NotificationManager controls time stamps of the notifications, it can ignore them for VIP notifications;

the class Notification can be modified so that a dedicated VIP notification icon is generated when VIP notifications are received. The class Notification also defines optional notifications such as ticker-text, alert sound, vibrate setting and flashing LED setting, any or all of which can be used to inform the user A that he has just received a VIP notification.

By VIP notifications, it is meant notifications issued by preferred contacts or from a preferred application, as previously explained.

Although the present disclosure has been described with reference to one or more examples, workers skilled in the art will recognize that changes may be made in form and detail without departing from the scope of the disclosure and/or the appended claims.

The invention claimed is:

1. A method carried out by a notification engine, for delivering to a user equipment incoming notifications from at least one application running on said user equipment, said application running on the user equipment being registered on said notification engine, wherein the method comprises the acts of:
   buffering received notifications within a group of notifications in a memory of the notification engine,
   defining at least one criterion for delivering the group of notifications, the at least one criterion comprising a maximum number N of notifications to be delivered at the same time, and
   delivering, according to said at least one criterion, the group of notifications to the user equipment, wherein the notifications of the group are delivered at the same time to the user equipment in the form of an ordered list, if the number of notifications of the group is less than or equal to the maximum number N;
   else, if the number of notifications of the group is more than the maximum number N, delivering a number of buffered notifications of the group equal to the maximum number, at the same time to the user equipment in the form of an ordered list, and delivering the other notifications of the group at a later time.

2. The method according to claim 1, wherein the at least one criterion comprises a time period to deliver the group of notifications to the user equipment, said act of delivering the group of notifications being performed upon expiration of said time period.

3. The method according to claim 1, wherein when the number of notifications within the group of notifications reaches said maximum number, the group of notifications is delivered to the user equipment (1).

4. The method according to claim 1, wherein the at least one criterion further comprises a time period to deliver the group of notifications to the user equipment, said method further comprising:
   upon reception of at least one notification from the registered application and intended to the user equipment, buffering said notification;
   if the predefined time period has elapsed, then considering the group of notifications to deliver to the user equipment by the end of said time period, said group of notifications comprising the buffered notifications if the number of buffered notifications is less than or equal to said maximum number, or else a number of buffered notifications equal to said maximum number and considering complementary notifications by the end of a next time period within a next group of notifications; and
   else, repeating the previous acts upon reception of a new notification.

5. The method according to claim 4, wherein the at least one criterion further comprises a periodicity and wherein the next time period is calculated by the notification engine based on said periodicity and said time period.

6. The method according to claim 1, wherein the group of notifications is delivered in the form of a list, wherein the at least one criterion comprises at least one identifier of a preferred application running on said user equipment, and wherein notifications from said preferred application are delivered on the top of said list.

7. The method according to claim 1, wherein the group of notifications is delivered in the form of a list, wherein at least one notification comprises an identifier of a sender, wherein the at least one criterion comprises at least one preferred contact and wherein if for a given notification, the identifier of the sender is the preferred contact, then said given notification is delivered on the top of said list.

8. The method according to claim 1, wherein after delivering the group of notifications to the user equipment, the buffered notifications that have been delivered are deleted from said notification engine and the previous acts are repeated.

9. The method according claim 1, wherein at least one notification comprises an identifier of a sender, wherein the at least one criterion comprises at least one preferred contact or one preferred application, wherein if for a given notification, the identifier of the sender is the preferred contact, or if the given notification is from a preferred application, then the act of buffering said given notification is skipped and the given notification is delivered.

10. A non-transitory storage medium comprising a computer program product recorded thereon and executable by a computer in the form of a software agent including at least one software module setup to implement a method carried out by a notification engine, for delivering to a user equipment incoming notifications from at least one application running on said user equipment, said application running on the user equipment being registered on said notification engine, wherein the method comprises:
   buffering received notifications within a group of notifications,
   defining at least one criterion for delivering the group of notifications, the at least one criterion comprising a maximum number N of notifications to be delivered at the same time, and
   delivering according to said at least one criterion the group of notifications to the user equipment, wherein the notifications of the group are delivered at the same time in the form of an ordered list, if the number of notifications of the group is less than or equal to the maximum number N;
   else, if the number of notifications of the group is more than the maximum number N, delivering a number of buffered notifications of the group equal to the maximum number, at the same time to the user equipment in the form of an ordered list, and delivering the other notifications of the group at a later time.

11. A notification engine for delivering to a user equipment notifications received from at least one application running on said user equipment, the notification engine comprising:
   a buffer, which buffers the received notifications within a group of notifications;
   a computer readable medium comprising software stored thereon; and a computing device configured by the software for performing acts of:
  registering said application running on said user equipment,
  defining at least one criterion for delivering the group of notifications, wherein the at least one criterion comprises a criterion to filter the group of notifications, the at least one criterion comprising a maximum number N of notifications to be delivered at the same time, and
  delivering according to said at least one criterion the group of notifications, wherein the notifications of the group are delivered at the same time in the form of an ordered list, if the number of notifications of the group is less than or equal to the maximum number N;
  else, if the number of notifications of the group is more than the maximum number N, delivering a number of buffered notifications of the group equal to the maximum number, at the same time to the user equipment in the form of an ordered list, and delivering the other notifications of the group at a later time.

12. The notification engine according to claim 11, wherein said notification engine is comprised in said user equipment.

13. A user equipment for receiving notifications from at least one application running on said user equipment, said user equipment comprising a notification engine comprising:
  a buffer, which buffers the received notifications within a group of notifications;
  a computer readable medium comprising software stored thereon; and
  a computing device configured by the software for performing acts of:
    registering said application running on said user equipment;
    defining at least one criterion for delivering the group of notifications, wherein the at least one criterion comprises a criterion to filter the group of notifications, the at least one criterion comprising a maximum number N of notifications to be delivered at the same time; and
    delivering according to said at least one criterion the group of notifications, wherein the notifications of the group are delivered at the same time, in the form of an ordered list, if the number of notifications of the group is less than or equal to the maximum number N;
    else, if the number of notifications of the group is more than the maximum number N, delivering a number of buffered notifications of the group equal to the maximum number, at the same time to the user equipment in the form of an ordered list, and delivering the other notifications of the group at a later time.

14. The method according to claim 1, wherein the at least one criterion for delivering the group of notifications comprises a criterion associated to the group of notifications.

* * * * *